(12) United States Patent
Jayarajan et al.

(10) Patent No.: US 11,216,297 B2
(45) Date of Patent: Jan. 4, 2022

(54) ASSOCIATING VIRTUAL NETWORK INTERFACES WITH A VIRTUAL MACHINE DURING PROVISIONING IN A CLOUD SYSTEM

(71) Applicant: Hewlett Packard Enterprise Development LP, Houston, TX (US)

(72) Inventors: Srinivasan Jayarajan, Bangalore Karnataka (IN); Karthikheya Varma Valivarthi, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 247 days.

(21) Appl. No.: 16/397,024

(22) Filed: Apr. 29, 2019

(65) Prior Publication Data
US 2020/0341796 A1 Oct. 29, 2020

(51) Int. Cl.
*G06F 9/455* (2018.01)
*G06F 8/60* (2018.01)

(52) U.S. Cl.
CPC ............ *G06F 9/45558* (2013.01); *G06F 8/60* (2013.01); *G06F 2009/4557* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 7,356,679 B1* | 4/2008 | Le | G06F 9/45558 713/1 |
| 2012/0110055 A1 | 5/2012 | Van Biljon et al. | |
| 2015/0350101 A1 | 12/2015 | Sinha et al. | |
| 2015/0363221 A1* | 12/2015 | Terayama | G06F 9/45558 718/1 |
| 2016/0014039 A1* | 1/2016 | Reddy | G06F 8/61 709/224 |

(Continued)

OTHER PUBLICATIONS

Barracuda.com; "Configuring the Barracuda CloudGen WAF with Multiple NIC's"; Nov. 7, 2017; 9 pages.

(Continued)

*Primary Examiner* — Lewis A Bullock, Jr.
*Assistant Examiner* — Melissa A Headly
(74) *Attorney, Agent, or Firm* — Hewlett Packard Enterprise Patent Department

(57) ABSTRACT

Examples described relate to associating virtual network interfaces with a virtual machine during provisioning in a cloud system. In an example, during booting of a virtual machine in a cloud system, a number of network interfaces associated with the virtual machine may be determined. A further determination may be made whether the number of network interfaces associated with the virtual machine is less than a number of network interfaces specified for the virtual machine to perform a function. In response to a determination that the number of network interfaces associated with the virtual machine is less than the number of network interfaces specified for the virtual machine to perform the function, an internal virtual network kernel interface may be created. The internal virtual network kernel interface may be associated with the virtual machine. The virtual machine may be provisioned in the cloud system.

20 Claims, 5 Drawing Sheets

(56) References Cited

U.S. PATENT DOCUMENTS

2020/0119981 A1* 4/2020 Guthrie .............. H04L 12/4633

OTHER PUBLICATIONS

Citrix.com; "Deploy a NetScaler VPX Instance on Microsoft Azure"; Nov. 2, 2018; 6 pages.
Networks, Inc.; "BIG-IP Virtual Edition and VMware ESXI Setup"; Aug. 13, 2018; 24 pages.
Oracle; "Virtual Network Interface Cards (VNICS)"; printed from webpage: https://docs.cloud.oracle.com/iaas/Content/Network/Tasks/managingVNICs.htm on Dec. 10, 2018; 8 pages.

* cited by examiner

ASSOCIATING VIRTUAL NETWORK INTERFACES WITH A VIRTUAL MACHINE DURING PROVISIONING IN A CLOUD SYSTEM

BACKGROUND

The advent of cloud-based computing architectures has opened new possibilities for businesses. As a result, an increasing number of enterprises are adopting cloud computing based solutions. Generally speaking, cloud computing involves delivery of computing as a service rather than a product, whereby shared resources (software, storage resources, etc.) are provided to computing devices as a service. The resources are shared over a network such as the internet. Cloud computing thus provides a quick and scalable access to computing resources and information technology (IT) services.

BRIEF DESCRIPTION OF THE DRAWINGS

For a better understanding of the solution, examples will now be described, with reference to the accompanying drawings, in which.

DETAILED DESCRIPTION

Figure 1:
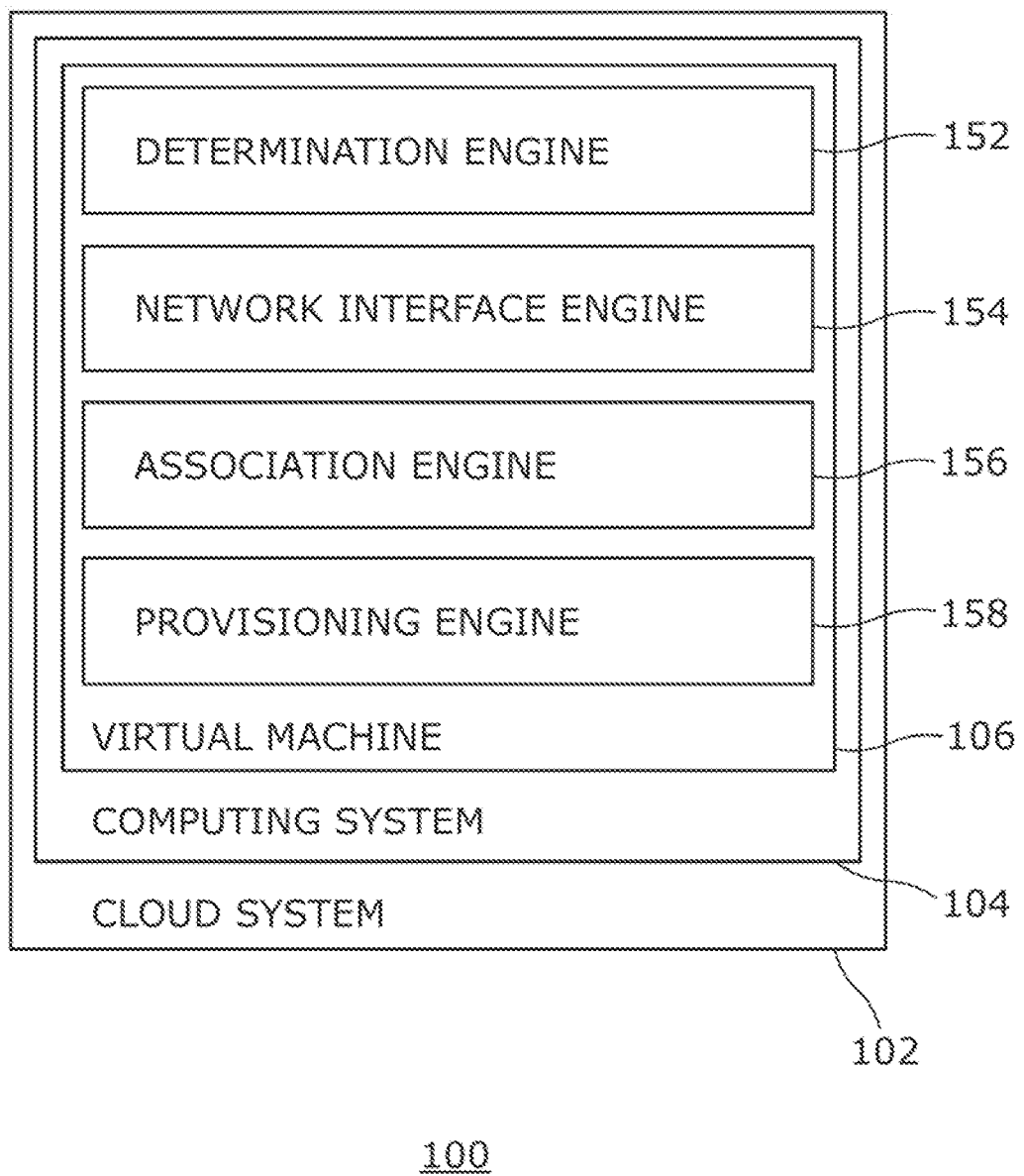
FIG. 1 is a block diagram of an example computing environment for associating virtual network interfaces with a virtual machine during provisioning in a cloud system.

Cloud computing is a delivery model for technology-enabled services that provides on-demand and pay-as-you-use access to an elastic pool of shared computing resources. Some examples of such resources may include applications, servers, storage, networks, etc. Cloud computing allows rapid provisioning of computing resources that could be scaled up or down depending on the requirements of a customer. Thus, these assets may be consumed "as a service".

One of the reasons behind the success of cloud computing is a technology called virtualization. Virtualization allows creation of a virtual version of a resource such as an operating system, a hardware platform, a storage resource etc. which may be shared, for instance, among different clients. Multiple virtual machines (VMs) may be created on a host device (for example, a server).

As used herein, the term "cloud system" (or "cloud") may refer to an on-demand network access to a shared pool of information technology resources (e.g., networks, servers, storage, and/or applications) that can be quickly provisioned. A cloud system may include a public cloud, a private cloud, or a hybrid cloud. To explain briefly, a cloud may be termed a public cloud if cloud computing services are rendered over a public network such as the internet. On the other hand, a private cloud is a proprietary network that supplies services to a specific set of users. A hybrid cloud combines private and public cloud services.

A virtual machine (VM) may support multiple network interfaces and assume the availability of a minimum set (usually greater than one) of interfaces during booting of the VM. However, some cloud systems (or cloud environments) may not support multiple network interfaces during the creation of a custom built virtual machine instance for the first time. Since a cloud system may support a limited set of network interfaces (e.g., just one) on a networking cloud instance to begin with, it places design constraints on a VM that may require more network interfaces to boot and function. If the additional network interfaces are not available, the VM may fail to boot. This is not a desirable scenario.

To address these technical challenges, the present disclosure describes various examples for associating virtual network interfaces with a virtual machine during provisioning in a cloud system. In an example, during booting of a virtual machine in a cloud system, a number of network interfaces associated with the virtual machine may be determined. A further determination may be made whether the number of network interfaces associated with the virtual machine is less than a number of network interfaces specified for the virtual machine to perform a function. In response to a determination that the number of network interfaces associated with the virtual machine is less than the number of network interfaces specified for the virtual machine to perform the function, an internal virtual network kernel interface may be created. The internal virtual network kernel interface may be associated with the virtual machine. The virtual machine may then be provisioned in the cloud system.

FIG. 1 is a block diagram of an example computing environment 100 associating virtual network interfaces with a virtual machine during provisioning in a cloud system. In an example, computing environment 100 may include a cloud system 102, a computing system 104, and a virtual machine 106. Although one computing system and one virtual machine is shown in FIG. 1, other examples of this disclosure may include more than one computing system and more than one virtual machine.

In an example, computing system 104 may represent any type of computing device capable of reading machine-executable instructions. Examples of the computing device may include, without limitation, a server, a desktop computer, a notebook computer, a tablet computer, a thin client, a mobile device, and the like.

In an example, cloud system 102 may include resources. As used herein, the "resources" of a cloud system 102 may refer to software resources (machine-executable instructions) or hardware resources. These may include, for example, computing resources, network resources, and/or storage resources. Computing resources (e.g., computing system 104) may be a hardware computing resource (e.g., includes at least one processor). The hardware computing resource may represent any type of system capable of reading machine-executable instructions. Examples of the hardware computing resource may include a server, a desktop computer, a notebook computer, a tablet computer, a thin client, a mobile device, a personal digital assistant (PDA), and the like. In an example, computing resources may represent software resources (machine-executable instructions). The software resources may include, for example, operating system software, firmware, and application software. Other examples of the software resources may include virtual machines, virtual servers, load balancers, firewalls, etc. In an example, computing resources may be a combination of hardware and software resources.

Network resources may include a network device, a network software, or any combination thereof. Some non-limiting examples of the network device may include a hub, a network switch, a network router, a virtual switch, and a virtual router.

Storage resources may include a storage device, a storage software, or any combination thereof. The storage device may be an internal storage device, an external storage device, or a network attached storage device. Other examples of the storage device may include a hard disk drive, a storage disc (for example, a CD-ROM, a DVD, etc.), a storage tape, a solid state drive, a USB drive, a Serial Advanced Technology Attachment (SATA) disk drive, a Fibre Channel (FC) disk drive, a Serial Attached SCSI (SAS) disk drive, a magnetic tape drive, an optical jukebox, and the like. In other examples, the storage device may be a Direct Attached Storage (DAS) device, a Network Attached Storage (NAS) device, a Redundant Array of Inexpensive Disks (RAID), a data archival storage system, or a block-based device over a storage area network (SAN).

The resources may be accessed by users or by applications, for example, for providing or deploying a cloud service. In an example, cloud system 102 may provide or deploy various types of cloud services. These services may include, for example, Infrastructure as a Service (IaaS), Platform as a Service (PaaS), and Software as a Service (SaaS).

In an example, cloud system 102 may be a public cloud, a private cloud, or a hybrid cloud. In a public cloud, cloud resources (like servers and storage) may be owned and operated by a third-party cloud service provider and delivered over a network (e.g., the Internet). In a public cloud, cloud resources may be shared with other organizations. On the other hand, in private cloud, cloud resources may be used exclusively by one organization.

In an example, computing system 104 may host a virtual machine (e.g., 106). In another example, computing system 104 may host multiple virtual machines. A virtual machine instance (or "virtual machine" or "VM") may be started from a virtual machine image, and may execute a program (machine-executable instructions) like a physical machine. A virtual machine image may refer to static data that may contain machine-executable instructions (e.g., an operating system, an application along with configuration and data files, etc.) that a virtual machine may run once started. A virtual machine image may include data that is used to initialize, or create a virtual machine instance. A virtual machine instance may refer to a running virtual machine. A VM may host a guest operating system, which may support one or more applications. Virtualization may allow the creation of one or virtual machines on cloud system 102. Virtual machines may be used for a variety of tasks, for example, to run multiple operating systems at the same time, or to test a new application on multiple platforms.

In an example, virtual machine 106 on computing system 104 may include a determination engine 152, a network interface engine 154, an association engine 156, and a provisioning engine 158.

Engines 152, 154, 156, and 158 may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of the virtual machine 106. In some examples, the at least one machine-readable storage medium may store instructions that, when executed by the at least one processing resource, at least partially implement some or all engines of the computing device. In such examples, the computing system 104 may include the at least one machine-readable storage medium storing the instructions and the at least one processing resource to execute the instructions. In an example, computing system 104 may be any combination of hardware and programming.

In an example, determination engine 152 may determine a number of network interfaces associated with virtual machine 106. In an example, the determination may occur during booting of virtual machine 106 in cloud system 102. In an example, determination may occur during validation of a virtual machine image that is used to initialize or create virtual machine 106 in cloud system 102. In an example, determination may determine, for example, a number of virtual and/or physical interfaces associated with virtual machine 106. In an example, determining the number of network interfaces associated with the virtual machine 106 may include determining a number of external network interfaces associated with the virtual machine 106.

Determination engine 152 may determine whether the number of network interfaces associated with the virtual machine 106 is less than a number of network interfaces specified for the virtual machine 106 to perform a function. In an example, a certain number of network interfaces may be specified in advance for the virtual machine 106 to perform a function. In an example, the function may include booting of the virtual machine 106 itself. Thus, a certain number of network interfaces may be specified in advance for the virtual machine 106 to boot. If the specified number of network interfaces are not available, the virtual machine 106 may fail to boot. In another example, a certain number of network interfaces may be specified in advance for the virtual machine 106 to perform a function. If the specified number of network interfaces are not available, the virtual machine 106 may fail to perform the function.

In an example, in response to a determination that the number of network interfaces associated with the virtual machine 106 is less than the number of network interfaces specified for the virtual machine 106 to perform a function, network interface engine 154 may create an internal virtual network kernel interface(s) in the virtual machine 106. In an example, network interface engine 154 may create internal virtual network kernel interface(s) in the virtual machine 106 to meet the number of network interfaces specified for the virtual machine 106 to perform the function.

As used herein, a virtual network kernel interface may include a virtual computer network interface that may be managed by the kernel. A virtual network kernel interface is a software (machine-executable instructions) interface, which may not be backed up by a hardware network controller. In an example, a virtual network kernel interface may include a TAP ("network tap") interface. A TAP interface may simulate a link layer device, and operate with layer 2 packets, for example, Ethernet frames. A TAP interface may allow a user-space program (machine-readable instructions) to see raw network traffic (for example, at Ethernet level). Packets sent by an operating system via a TAP interface may be delivered to a user-space program which may attach itself to the interface. A user-space program may interact with a TAP interface as if it were a hardware network adaptor. A user-space program may also share packets with the TAP interface.

Association engine 156 may associate the internal virtual network kernel interface(s) created by network interface engine 154 with the virtual machine 106. In an example, an internal virtual network kernel interface(s) associated with the virtual machine 106 may not be visible to an external network outside the virtual machine 106 until the virtual machine 106 is provisioned in the cloud system 102.

Figure 2:
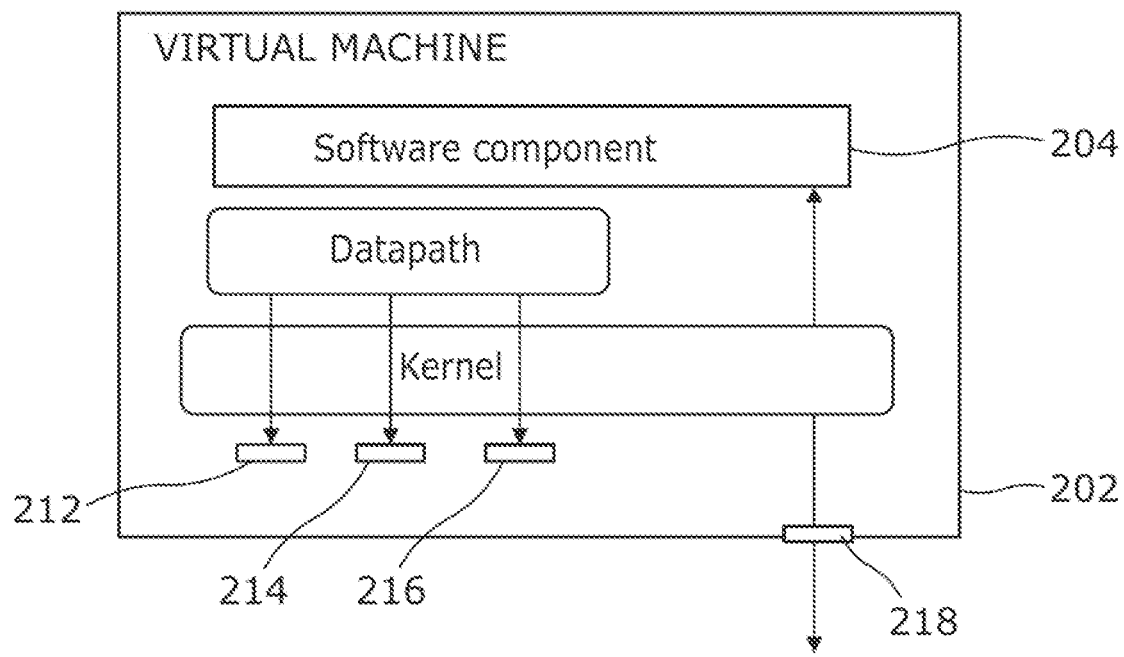
FIG. 2 is a block diagram of an example computing environment for associating virtual network interfaces with a virtual machine during provisioning in a cloud system.

However, in an example, the internal virtual network kernel interface(s) associated with the virtual machine 106 may be visible to an internal software component (machine-executable instructions) of the virtual machine 106 prior to provisioning of the virtual machine 106 in the cloud system 102. This is illustrated in FIG. 2 that shows, by way of an example, three internal virtual network kernel interface(s) 212, 214, 216 and an external network interface 218 in a virtual machine 202. The three internal virtual network kernel interface(s) are visible to an internal software component (machine-executable instructions) 204 of virtual machine 202. In an example, the internal virtual network kernel interface(s) associated with the virtual machine 106 may act as a layer 2 network interface to a component of the virtual machine 106.

In an example, the internal virtual network kernel interface(s) associated with the virtual machine 106 may be used by the virtual machine 106 to perform a function, for example, for booting. The internal virtual network kernel interface(s) associated with the virtual machine 106 may not be known outside of the virtual machine 106, and may not be used to carry data traffic.

Figure 3:
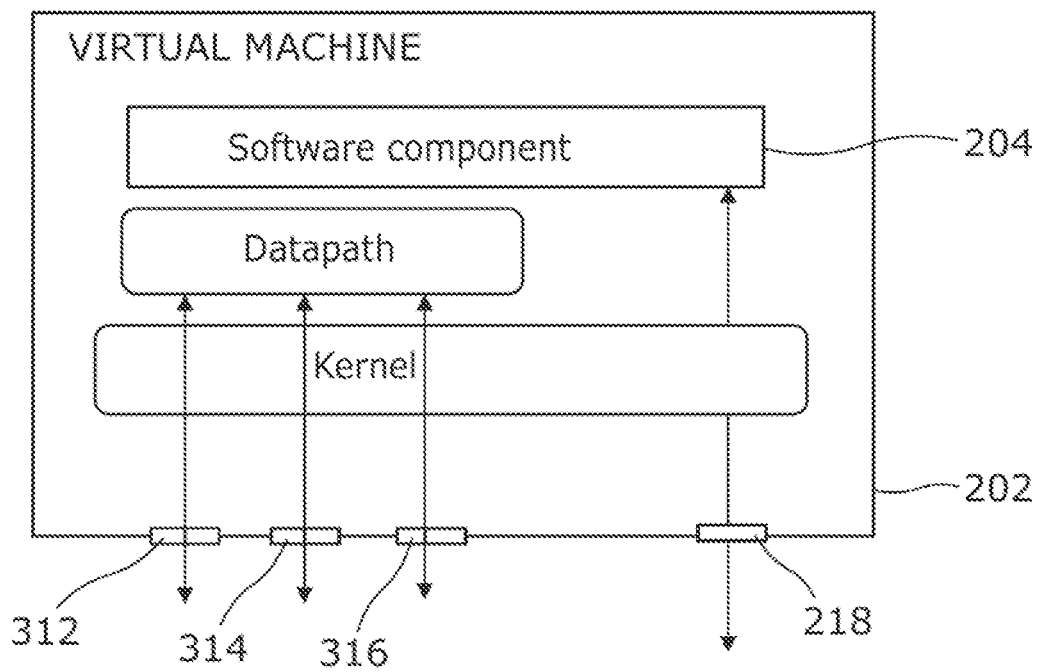
FIG. 3 is a block diagram of an example computing environment for associating virtual network interfaces with a virtual machine during provisioning in a cloud system.

The association of internal virtual network kernel interface(s) with the virtual machine 106 may allow the virtual machine 106 to perform a function, for example, booting. In an example, provisioning engine 158 may then provision the virtual machine 106 in the cloud system 102. Once the virtual machine 106 is provisioned, provisioning engine 158 may associate an external network interface(s) with the virtual machine 106. In an example, the external network interface(s) may replace the internal virtual network kernel interface(s) associated earlier with the virtual machine 106 by association engine 156. This is illustrated in FIG. 3 that shows, by way of an example, three external network interface(s) 312, 314, 316 that replace internal virtual network kernel interfaces 212, 214, 216 respectively of FIG. 2.

In an example, the external network interface may be a virtual network interface. In an example, the external network interface may be physical network interface. In an example, once the external network interface(s) is associated with the virtual machine 106, provisioning engine 158 may reboot the virtual machine 106 in the cloud system 102 so that the external network interface(s) may be used to carry data traffic.

The use of internal virtual network kernel interface may simplify the internal design of a software component (e.g., 204). Without the kernel interfaces the system may see just one interface during initial provisioning (since the cloud system may have assigned only one interface to the virtual machine). Handling availability of only a single interface may have necessitated changes in the software component and hence increased its complexity. The present disclosure helps obviates that ask.

Figure 4:
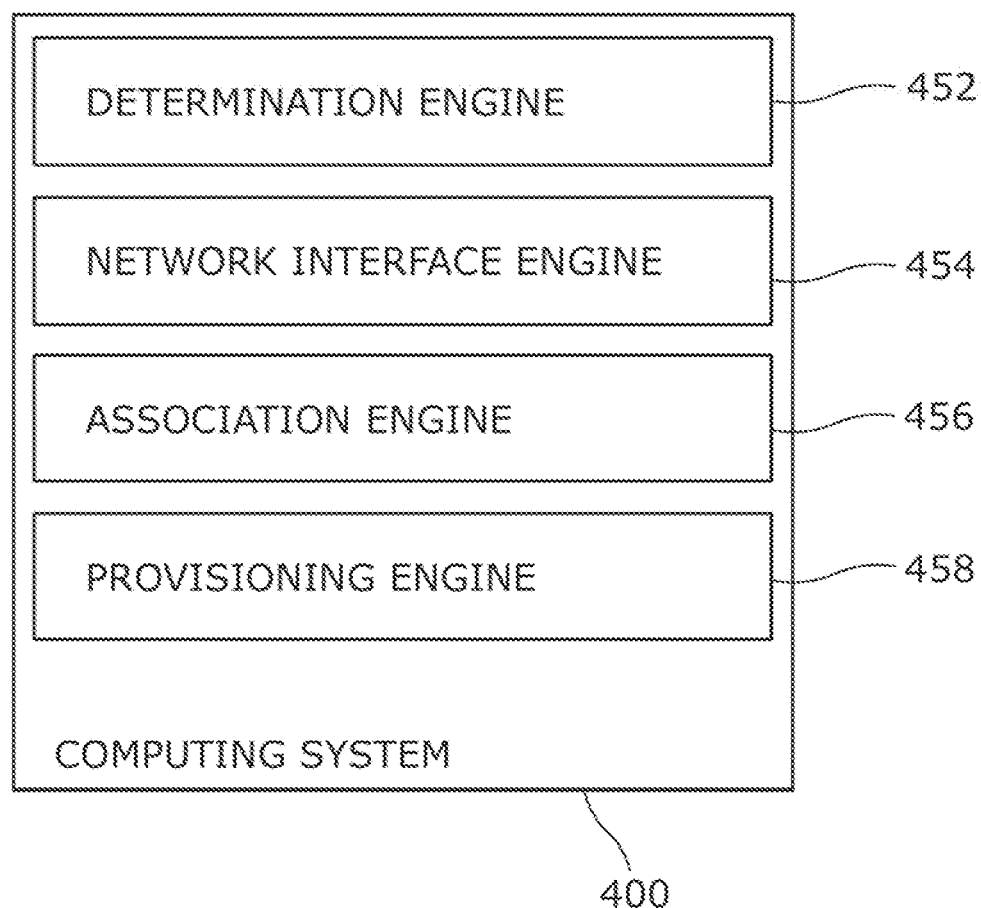
FIG. 4 is a block diagram of an example computing system associating virtual network interfaces with a virtual machine during provisioning in a cloud system.

FIG. 4 is a block diagram of an example computing system 400 for associating virtual network interfaces with a virtual machine during provisioning in a cloud system. In an example, computing system 400 may be analogous to the computing system 104 of FIG. 1, in which like reference numerals correspond to the same or similar, though perhaps not identical, components. For the sake of brevity, components or reference numerals of FIG. 4 having a same or similarly described function in FIG. 1 are not being described in connection with FIG. 4. Said components or reference numerals may be considered alike.

In an example, computing system 400 may represent any type of computing device capable of reading machine-executable instructions. Examples of computing device may include, without limitation, a server, a desktop computer, a notebook computer, a tablet computer, a thin client, a mobile device, and the like.

In an example, computing system 400 may include a determination engine 452, a network interface engine 454, an association engine 456, and a provisioning engine 458. In an example, determination engine 452, network interface engine 454, association engine 456, and provisioning engine 458 may perform functionalities similar to those described earlier in reference to determination engine 152, network interface engine 154, association engine 156, and provisioning engine 158 of FIG. 1, respectively.

In an example, determination engine 452 may determine, during booting of a virtual machine (e.g., 106) in a cloud system (e.g., 102), a number of network interfaces associated with the virtual machine. Determination engine 452 may determine whether the number of network interfaces associated with the virtual machine is less than a number of network interfaces specified for the virtual machine to perform a function. Network interface engine 454, in response to a determination that the number of network interfaces associated with the virtual machine is less than the number of network interfaces specified for the virtual machine to perform the function, may create an internal virtual network kernel interface to meet the number of network interfaces specified for the virtual machine to perform the function. Association engine 456 may associate the internal virtual network kernel interface with the virtual machine. Provisioning engine 458 may provision the virtual machine in the cloud system.

Figure 5:
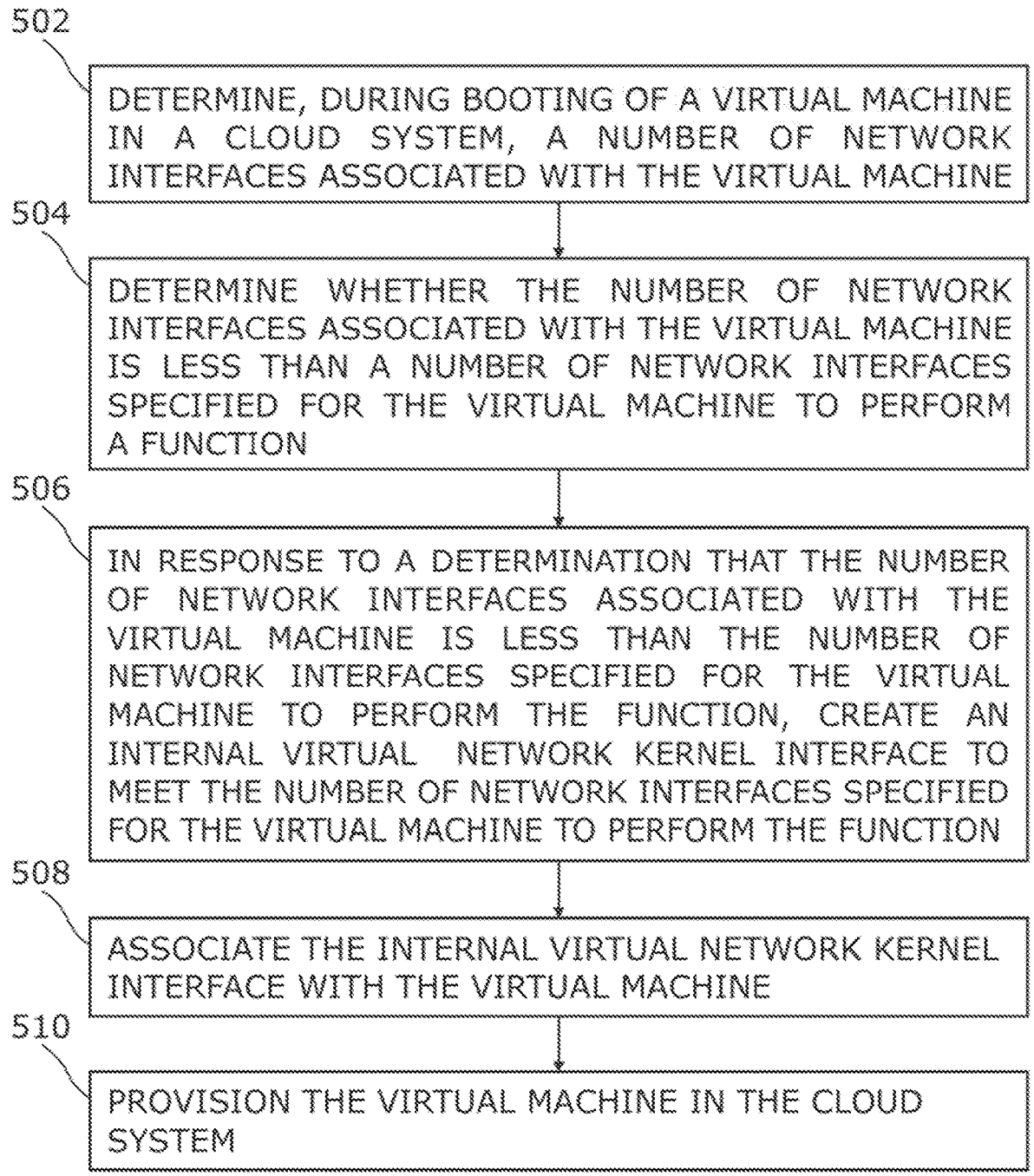
FIG. 5 is a flowchart of an example method of associating virtual network interfaces with a virtual machine during provisioning in a cloud system.

FIG. 5 is a flowchart of an example method 500 of associating virtual network interfaces with a virtual machine during provisioning in a cloud system. The method 500, which is described below, may be executed on a computing device such as computing device 104 of FIG. 1 or computing system 400 of FIG. 4. However, other computing devices may be used as well. At block 502, during booting of a virtual machine in a cloud system, a number of network interfaces associated with the virtual machine may be determined. At block 504, a determination may be made whether the number of network interfaces associated with the virtual machine is less than a number of network interfaces specified for the virtual machine to perform a function. At block 506, in response to a determination that the number of network interfaces associated with the virtual machine is less than the number of network interfaces specified for the virtual machine to perform the function, an internal virtual network kernel interface may be created. At block 508, the internal virtual network kernel interface may be associated with the virtual machine. At block 510, the virtual machine may be provisioned in the cloud system.

Figure 6:
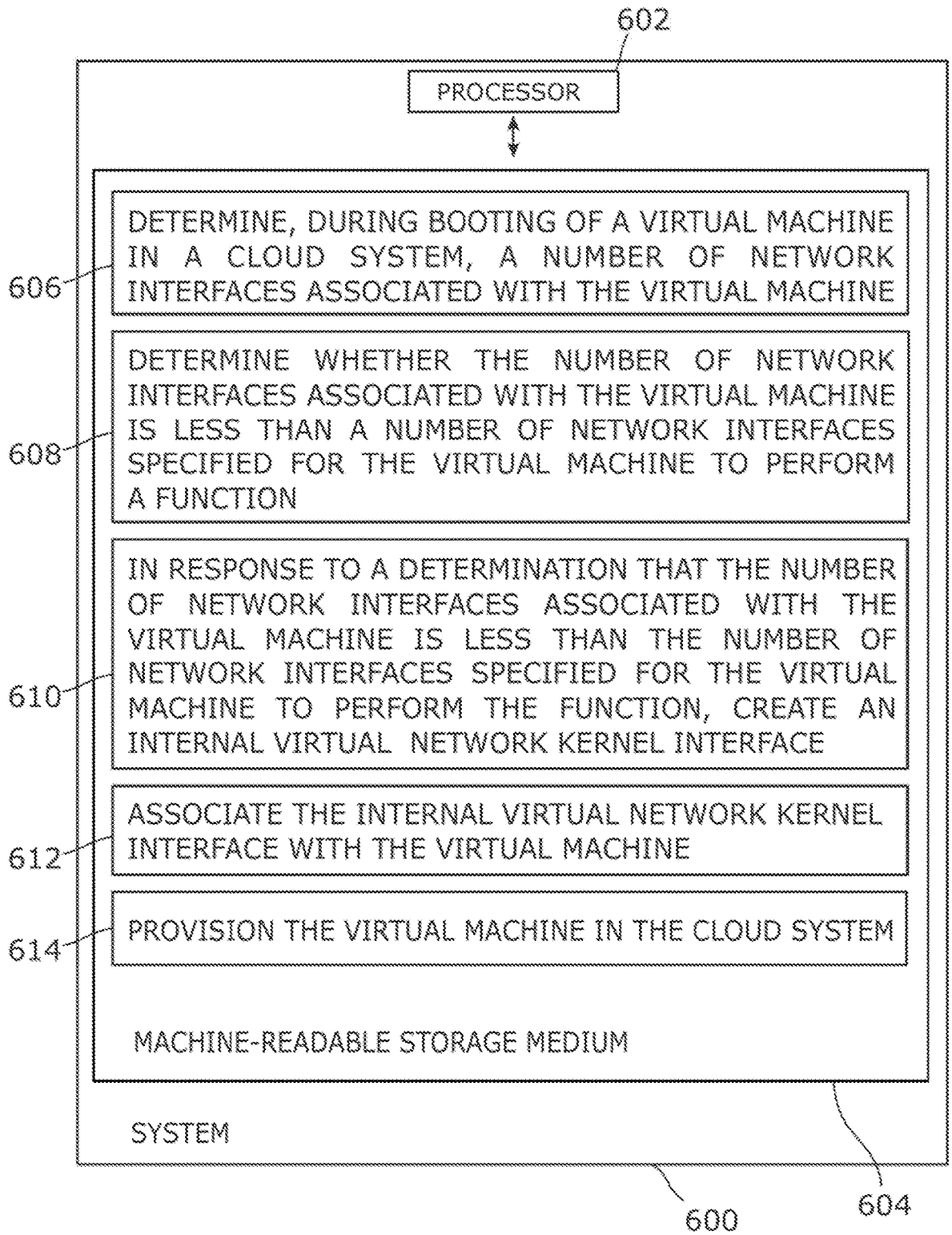
FIG. 6 is a block diagram of an example system including instructions in a machine-readable storage medium associating virtual network interfaces with a virtual machine during provisioning in a cloud system.

FIG. 6 is a block diagram of an example system 600 including instructions in a machine-readable storage medium for associating virtual network interfaces with a virtual machine during provisioning in a cloud system. System 600 includes a processor 602 and a machine-readable storage medium 604 communicatively coupled through a system bus. In some examples, system 600 may be analogous to a computing system 104 of FIG. 1 or computing system 400 of FIG. 4. Processor 602 may be any type of Central Processing Unit (CPU), microprocessor, or processing logic that interprets and executes machine-readable instructions stored in machine-readable storage medium 604. Machine-readable storage medium 604 may be a random access memory (RAM) or another type of dynamic storage device that may store information and machine-readable instructions that may be executed by processor 602. For example, machine-readable storage medium 604 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 604 may store instructions 606, 608, 610, 612, and 614.

In an example, instructions 606 may be executed by processor 602 to determine, during booting of a virtual machine in a cloud system, a number of network interfaces associated with the virtual machine. Instructions 608 may be executed by processor 602 to determine whether the number of network interfaces associated with the virtual machine is less than a number of network interfaces specified for the virtual machine to perform a function. Instructions 610 may be executed by processor 602 to, in response to a determination that the number of network interfaces associated with the virtual machine is less than the number of network interfaces specified for the virtual machine to perform the function, create an internal virtual network kernel interface. Instructions 612 may be executed by processor 602 to associate the internal virtual network kernel interface with the virtual machine. Instructions 614 may be executed by processor 602 to provision the virtual machine in the cloud system.

For the purpose of simplicity of explanation, the example method of FIG. 5 is shown as executing serially, however it is to be understood and appreciated that the present and other examples are not limited by the illustrated order. The example systems of FIGS. 1, 2, 3, 4 and 6, and method of FIG. 5 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution.

The invention claimed is:

1. A method comprising:
    determining, during booting of a virtual machine in a cloud system, a number of network interfaces associated with the virtual machine;
    determining whether the number of network interfaces associated with the virtual machine is less than a number of network interfaces specified for the virtual machine to perform a function;
    in response to a determination that the number of network interfaces associated with the virtual machine is less than the number of network interfaces specified for the virtual machine to perform the function, creating an internal virtual network kernel interface that is associated with the virtual machine and is visible to a component of the virtual machine prior to provisioning of the virtual machine in the cloud system to meet the number of network interfaces specified for the virtual machine to perform the function, wherein the internal virtual kernel interface does not carry external data traffic;
    associating the internal virtual network kernel interface with the virtual machine;
    provisioning the virtual machine in the cloud system; and
    replacing the internal virtual network kernel interface with an external network interface in the virtual machine after the provisioning.

2. The method of claim 1, wherein the external network interface is a virtual network interface.

3. The method of claim 1, wherein the external network interface is a physical network interface.

4. The method of claim 1, wherein determining the number of network interfaces associated with the virtual machine includes determining a number of external network interfaces associated with the virtual machine.

5. The method of claim 1, further comprising deploying the virtual machine in the cloud system.

6. The method of claim 1, further comprising validating the virtual machine for deployment by a cloud management system.

7. The method of claim 1, wherein the cloud system is a public cloud system.

8. The method of claim 1, wherein the internal virtual network kernel interface associated with the virtual machine is not visible to an external network outside the virtual machine until the virtual machine is provisioned in the cloud system.

9. A system comprising:
    a processor; and
    a machine-readable storage medium storing instructions that, when executed by the processor, cause the processor to:
        determine, during booting of a virtual machine in a cloud system, a number of network interfaces associated with the virtual machine;

determine whether the number of network interfaces associated with the virtual machine is less than a number of network interfaces specified for the virtual machine to perform a function;

respond to a determination that the number of network interfaces associated with the virtual machine is less than the number of network interfaces specified for the virtual machine to perform the function, by creating an internal virtual network kernel interface that is associated with the virtual machine and is visible to a component of the virtual machine prior to provisioning of the virtual machine in the cloud system to meet the number of network interfaces specified for the virtual machine to perform the function, wherein the internal virtual kernel interface does not carry external data traffic;

associate the internal virtual network kernel interface with the virtual machine;

provision the virtual machine in the cloud system, and replace the internal virtual network kernel interface with an external network interface in the virtual machine after the provisioning.

10. The system of claim 9, wherein the network interfaces include virtual network interfaces.

11. The system of claim 9, wherein the network interfaces include physical network interfaces.

12. The system of claim 9, wherein the internal virtual network kernel interface includes a TAP network interface.

13. The system of claim 9, wherein the cloud system is a private cloud system.

14. The system of claim 9, wherein the function includes booting of the virtual machine.

15. A non-transitory machine-readable storage medium comprising instructions, the instructions executable by a processor to:

determine, during booting of a virtual machine in a cloud system, a number of network interfaces associated with the virtual machine;

determine whether the number of network interfaces associated with the virtual machine is less than a number of network interfaces specified for the virtual machine to perform a function;

in response to a determination that the number of network interfaces associated with the virtual machine is less than the number of network interfaces specified for the virtual machine to perform the function, create an internal virtual network kernel interface that is associated with the virtual machine and is visible to a component of the virtual machine prior to provisioning of the virtual machine in the cloud system to meet the number of network interfaces specified for the virtual machine to perform the function, wherein the internal virtual kernel interface does not carry external data traffic;

associate the internal virtual network kernel interface with the virtual machine;

provision the virtual machine in the cloud system; and replace the internal virtual network kernel interface with an external network interface in the virtual machine after the provisioning.

16. The storage medium of claim 15, wherein the internal virtual network kernel interface associated with the virtual machine is not visible to an external network outside the virtual machine until the virtual machine is provisioned in the cloud system.

17. The storage medium of claim 15, wherein the function includes booting of the virtual machine.

18. The storage medium of claim 15, wherein the internal virtual network kernel interface associated with the virtual machine acts as a layer 2 network interface to a component of the virtual machine.

19. The storage medium of claim 15, wherein the internal virtual network kernel interface is not used for carrying data traffic.

20. The storage medium of claim 15, wherein the network interfaces include virtual network interfaces or physical network interfaces.

* * * * *